(No Model.)
C. F. SPERY.
PIPE TONGS.
No. 444,923.
Patented Jan. 20, 1891.
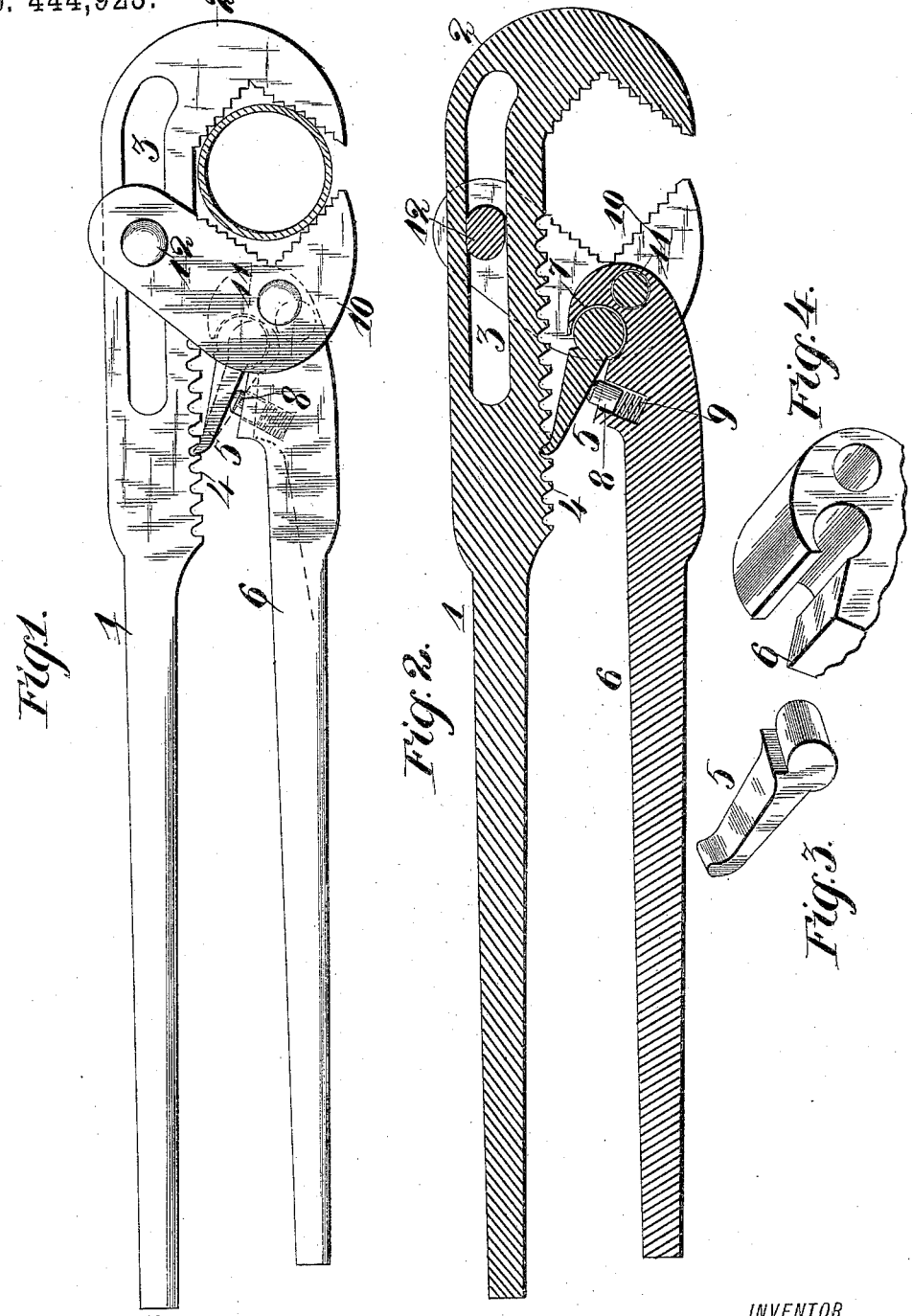
WITNESSES:
INVENTOR
Charles F. Spery.
BY Higdon & Higdon
ATTORNEYS.

UNITED STATES PATENT OFFICE.

CHARLES F. SPERY, OF HERMANN, MISSOURI.

PIPE-TONGS.

SPECIFICATION forming part of Letters Patent No. 444,923, dated January 20, 1891.

Application filed November 24, 1890. Serial No. 372,498. (No model.)

*To all whom it may concern:*

Be it known that I, CHARLES F. SPERY, of the city of Hermann, in the county of Gasconade, State of Missouri, have invented certain new and useful Improvements in Pipe-Tongs, of which the following is a full, clear, and exact description, reference being had to the accompanying drawings, forming a part hereof.

My invention relates to improvements in "pipe-tongs;" and it consists in the novel arrangement and combination of parts, as will be more fully hereinafter described, and designated in the claims.

In the drawings, Figure 1 is a side elevation of my complete invention, showing the *modus operandi* when applied to a pipe or other object to be functionally operated. Fig. 2 is a longitudinal mid-section of the same. Fig. 3 is a perspective view of a dog or retaining-catch which I employ in carrying out my invention. Fig. 4 is a detail view of a socket used in my invention, with the parts embodying said socket broken away.

Referring to the drawings, 1 represents a primary arm, the front and terminal portion of which is curved and forms an approximately triangular-shaped hook or jaw 2. The inner surface of said hook or jaw is provided with a series of engaging ratchet-teeth adapted to impinge and bite by the application of force any object to which said hook or jaw in its functional operation is applied. Said arm 1 is provided with an elongated slot 3, which slot is formed in said arm in the portion of the arm adjacent to hook or jaw 2. The front portion of said slot is formed into a curvilinear shape. The inner portion of said arm is also provided with a series of downwardly-projecting catches or hooks 4, which are adapted to receive the pointed end of a dog or retaining-catch 5.

6 indicates a secondary arm or lever, which is provided at its front and terminal portion with a curved and rounded surface and with a socket 7, adapted to receive the bulb portion of dog 5, in which said dog is free to move in two directions only, backwardly and forwardly. To the rearward of said socket there is a yieldingly-projecting pin 8, which is adapted to press against the rear surface of dog 5, whereby said dog is held in direct engagement with the catches or hooks 4. Said pin rests in a suitable and corresponding depression, which depression is provided with a spiral and elastic spring 9, which spring is employed for holding pin 8 in its functional operation, which is to hold the dog, as aforesaid, in catches 4. Said arms 1 and 6 are held together by means of hook plates or jaws 10, which plates or jaws are provided on their inner edges or surfaces with a series of ratchet or impinging teeth. Said plates are held together with arms 1 and 6 interposed between them by means of rivets or bolts 11 and 12. Rivet 11 passes through a suitable perforation made in the region of the hook portion of said plates or jaws, and also through a suitable perforation formed in the front end of arm 6, in which rivet 11 is free to move. Rivet 12 is provided with two parallel plane surfaces and passes through the ends of hook-plates 10 at the end the greatest distance from the hooks, and also passes through slot 3, and in said slot rivet 12 is free to move backward and forward, but is not adapted to be turned in said slot. Hook plates or jaws 10 are pivotally secured on rivet 11.

My device is adapted to functionally operate various sizes of pipes or bolts varying from the smallest to a comparatively large pipe or bolt, and can be applied in any well-known mechanical manner to an ordinary combined wrench or pipe-tongs.

Having given an explicit and fully elaborate description of my device, as is necessary to comprehend its mechanical construction, I will now proceed to describe its application and use.

The device is constructed and put together as above stated, and when the operator desires to use it he should apply hook or jaw 2 to whatever object desired, and then push the corrugated or toothed surface of the plates 10 against said pipe, and by bringing the arm 6 to a depressed or lowered position dog 5 will engage in hooks or catches 4, and will push said plates forward impingingly on the pipe. Dog 5, being located in its appropriate socket, as above stated, acts as a fulcrum-point for the secondary arm 6. The fulcrum-point being located between the power and the resistance, a double lever of the first kind is formed.

Having fully described my invention, what I claim is—

1. Pipe-tongs consisting of a primary and secondary arm, the latter of which is fulcrumed between the power adapted to be applied thereto and the resistance to be overcome, as and for the purposes specified.

2. Pipe-tongs consisting of a primary arm provided with a hook or jaw, a similar hook or jaw adapted to move on said arm, a secondary arm pivoted thereto, and a dog which acts as a fulcrum for said secondary arm, substantially as set forth.

3. Pipe-tongs consisting of a primary arm provided at its front end with a jaw 2, provided with teeth, hook plates or jaws 10, adapted to move on said arm, and a yieldingly-mounted pin 8 for holding said dog in functional contact with primary arm 1, substantially as set forth.

4. The combination of a primary arm 1, provided with a toothed jaw 2, an elongated slot 3, and hooks 4, a secondary arm 6, provided with a socket 7 and a suitable depression for receiving a spring 9 and pin 8, a dog 5, located in said socket, jaws 10, and rivets 11 and 12 for securing said arms and jaws together, substantially as set forth.

In testimony whereof I affix my signature in presence of two witnesses.

CHARLES F. SPERY.

Witnesses:
C. F. A. MUELLER,
E. E. LONGAU.